(12) United States Patent
Ahokas et al.

(10) Patent No.: US 11,005,152 B2
(45) Date of Patent: May 11, 2021

(54) RFID TRANSPONDER

(71) Applicant: Confidex OY, Tampere (FI)

(72) Inventors: Heikki Ahokas, Tampere (FI); Miika Pylvanainen, Ylojarvi (FI)

(73) Assignee: Confidex OY, Tampere (FI)

( * ) Notice: Subject to any disclaimer, the term of this patent is extended or adjusted under 35 U.S.C. 154(b) by 0 days.

(21) Appl. No.: 15/818,166

(22) Filed: Nov. 20, 2017

(65) Prior Publication Data
US 2018/0151942 A1    May 31, 2018

(30) Foreign Application Priority Data

Nov. 25, 2016  (EP) .................................... 16200609

(51) Int. Cl.
| H01Q 1/22 | (2006.01) |
| G06K 19/077 | (2006.01) |
| G06K 19/07 | (2006.01) |
| H01Q 1/48 | (2006.01) |
| H01Q 7/00 | (2006.01) |
| H01Q 9/04 | (2006.01) |
| G06K 1/20 | (2006.01) |

(52) U.S. Cl.
CPC ....... *H01Q 1/2225* (2013.01); *G06K 19/0723* (2013.01); *G06K 19/07722* (2013.01); *G06K 19/07773* (2013.01); *H01Q 1/2208* (2013.01); *H01Q 1/48* (2013.01); *H01Q 7/00* (2013.01); *H01Q 9/0421* (2013.01); *G06K 1/20* (2013.01)

(58) Field of Classification Search
CPC .......... H01Q 1/48; H01Q 1/2225; G06K 1/20; G06K 19/07773; G06K 19/07722; G06K 19/0723
See application file for complete search history.

(56) References Cited

U.S. PATENT DOCUMENTS

| 6,265,977 B1* | 7/2001 | Vega ................... G06K 19/0723 257/679 |
| 7,109,867 B2* | 9/2006 | Forster ............. G06K 19/07749 340/572.3 |
| 7,652,636 B2* | 1/2010 | Forster ................. H01Q 1/2225 343/860 |
| 8,717,244 B2* | 5/2014 | Joyce, Jr. ............. H01Q 1/2225 343/795 |
| 10,171,133 B1* | 1/2019 | Kyllonen ............. H04B 5/0068 |
| 2004/0201522 A1* | 10/2004 | Forster ............. G06K 19/07749 343/700 MS |

(Continued)

FOREIGN PATENT DOCUMENTS

WO    2016059285 A1    4/2016

OTHER PUBLICATIONS

European Search Report issued in EP Application No. EP16200609.2 dated May 2, 2017; parent EP Application.

*Primary Examiner* — Ab Salam Alkassim, Jr.
(74) *Attorney, Agent, or Firm* — Jeffrey T. Placker, Esq; Holland & Knight LLP

(57) ABSTRACT

An RFID transponder, comprising an antenna, comprising a radiating element an IC, and a ground plane arranged under the radiating element, the ground plane being solid without openings. The radiating element comprises a near field communication section extending over the edge of the ground plane for enabling near field communication of the antenna by the ground plane from backside of the RFID transponder.

5 Claims, 4 Drawing Sheets

(56) References Cited

U.S. PATENT DOCUMENTS

| | | | |
|---|---|---|---|
| 2005/0024287 A1* | 2/2005 | Jo | G06K 19/0726 343/822 |
| 2006/0044192 A1* | 3/2006 | Egbert | G06K 19/07749 343/700 MS |
| 2006/0054710 A1* | 3/2006 | Forster | H01Q 1/22 235/492 |
| 2006/0208955 A1* | 9/2006 | Kai | H01Q 1/22 343/795 |
| 2006/0214801 A1* | 9/2006 | Murofushi | G06K 19/07749 340/572.7 |
| 2006/0244605 A1* | 11/2006 | Sakama | H01Q 1/22 340/572.7 |
| 2007/0040028 A1* | 2/2007 | Kawamata | G06K 19/07749 235/435 |
| 2007/0171071 A1* | 7/2007 | Chiu | H01Q 1/2208 340/572.7 |
| 2007/0200782 A1* | 8/2007 | Hayama | G06K 19/07786 343/795 |
| 2007/0216591 A1* | 9/2007 | Tsirline | G06K 7/10316 343/753 |
| 2008/0231421 A1* | 9/2008 | Tuttle | G06K 19/07749 340/10.1 |
| 2009/0224056 A1* | 9/2009 | Kwon | G06K 19/07749 235/492 |
| 2010/0065647 A1* | 3/2010 | Ritamaki | G06K 19/041 235/492 |
| 2011/0017832 A1* | 1/2011 | Ritamaki | G06K 19/0773 235/492 |
| 2011/0115611 A1* | 5/2011 | Tsirline | G06K 17/0025 340/10.2 |
| 2012/0019363 A1* | 1/2012 | Fein | G06K 19/072 340/10.1 |
| 2013/0050045 A1* | 2/2013 | Chacinski | H01Q 1/243 343/848 |
| 2013/0271265 A1* | 10/2013 | Finn | H01Q 1/2225 340/10.1 |
| 2014/0266622 A1* | 9/2014 | Alicot | G06K 19/07771 340/10.1 |
| 2015/0129666 A1* | 5/2015 | Butler | G06K 7/10366 235/492 |
| 2017/0316299 A1* | 11/2017 | Ritamaki | G06K 19/07718 |

* cited by examiner

RFID TRANSPONDER

RELATED APPLICATIONS

The subject application claims the benefit of European Patent Application No. 16200609.2, filed on Nov. 25, 2016. The content of which is herein incorporated by reference in its entirety.

BACKGROUND

The invention relates to an RFID transponder.

It is known to code RFID transponders by using RFID printer-encoders. An RFID printer-encoder typically prints visual information like barcode or human readable on top of the RFID transponder. Same or, alternatively, different information is electronically programmed inside the IC memory of the RFID transponder by the reader antenna of the printer.

However, some RFID transponders have structures which may isolate the antenna of the transponder from the radiation of the reader antenna of the printer. Said structure of the RFID transponder is usually the ground plane of the antenna of said transponder. For instance, if the printer has its reader antenna below the ground plane, it is usually not possible to couple the reader antenna to the antenna of the RFID transponder. Therefore the RFID transponder cannot be encoded in said printer.

BRIEF DESCRIPTION

Viewed from a first aspect, there can be provided an RFID transponder, comprising an antenna, comprising a radiating element, an IC, a ground plane arranged under the radiating element, the ground plane being solid without openings, the radiating element comprising a near field communication section extending over the edge of the ground plane for enabling near field communication of the antenna by the ground plane from backside of the RFID transponder.

Thereby an RFID transponder which may be encoded in most RFID printers may be achieved. The near field communication section enables near field communication by and beyond the ground plane. Down to this, there is no need, for instance, for a separate secondary antenna, which would be adapted for near field communication with e.g. a RFID printer-encoder or a RFID encoder.

The RFID transponder is characterised by what is stated in the characterising part of the independent claim. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, a spacer layer made of a dielectric material is arranged between the antenna element and the ground plane.

In one embodiment, the antenna comprises two radiating elements arranged at a distance from each other, and the IC being situated between said two radiating elements.

In one embodiment, the radiating element is quadrangle.

In one embodiment, the near field communication section is provided by prolongation of two parallel sides of the quadrangle, the near field communication section thus being situated at one edge of the radiating element.

In one embodiment, the radiating element is a meandering element.

In one embodiment, the radiating element is a PIFA element.

In one embodiment, the radiating element is a loop element.

In one embodiment, the near field communication section is provided on at least two edges of the radiating element by extending said edges over the edge of the ground plane.

In one embodiment, the antenna comprises at least two radiating elements, and only one of said radiating elements comprises the near field communication section.

In one embodiment, the near field communication section is provided by a projection extending from the radiating element and having an elongated aspect ratio.

In one embodiment, the projection comprises at least one bend.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
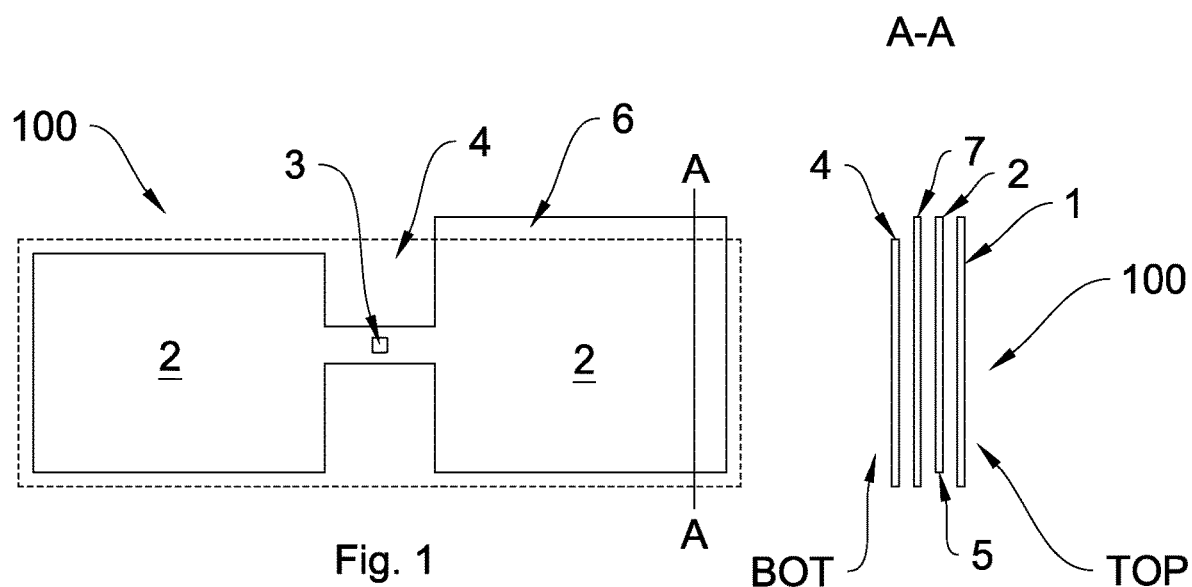
FIG. 1 is a schematic top view of an RFID transponder.

FIG. 1 is a schematic top view of an RFID transponder. The RFID transponder 100 may comprise a printable surface or face element 1, an antenna element 2, and an IC 3. The RFID transponder 100 further comprises a ground plane 4 that is made of metal or some other electrically conductive material or composition. The ground plane 4 is solid without openings and arranged under the antenna element 2.

Layers of the RFID transponder 100 are typically attached together with suitable adhesive layers and sealed by e.g. a silicone liner.

The RFID transponder 100 may further comprise a spacer layer 7 that is arranged to make distance between the antenna element 2 and the ground plane 4. The spacer layer 7 is made of a dielectric material, such as polyethylene PE, polypropylene PP polyethylene terephthalate PET, in a solid or a foamed form.

The printable surface 1 is arranged on the top side of the transponder 100. The surface 1 may be a thin material layer manufactured from e.g. paper or plastic based material, or a layer of paint(s) and/or lacquer(s).

The antenna element 2 and the IC 3 (together with further electronic components, if any) may be arranged to a structural module such as an inlay 5 comprising a dielectric substrate.

The edges or peripheral shape of the ground plane 4 is shown by dash line in Figures. The radiating element 2 comprises a near field communication section 6 that extends over the edge of the ground plane 4 for enabling near field communication of the antenna by the ground plane 4 from backside of the RFID transponder 100.

In the embodiment shown in FIG. 1, the antenna comprises two radiating elements 2 the shape of which is quadrangle and which are arranged at a distance from each other. The IC 3 is situated between the radiating elements 2. The near field communication section 6 is provided by prolongation of two parallel sides of one of the quadrangles, so the near field communication section 6 is situated at one edge of the radiating element 2.

For example, if the reader antenna of an RFID printer-encoder, such as Zebra RZ600, is on the bottom side BOT of the RFID transponder 100, the near field communication section 6 makes it possible to couple said reader antenna with the antenna element 2 of the transponder although the reader antenna is situated opposite side of the ground plane 4 compared to the antenna element 2 of the transponder, thus enabling encoding the RFID transponder 100.

The radiating element 2 as such may be of any type of radiating element suitable for the RFID transponder 100. Some further examples of the radiating element are a meandering element, a PIFA element and a loop element.

Also the shape of the radiating element 2 as well as number of the radiating elements 2 may vary. For instance, the number of the radiating elements 2 may be one, two, three, four or even more.

Furthermore, the coupling of the IC 3 and the radiating element 2 may vary: a galvanic, an inductive or capacitive coupling may be used.

Figure 2:
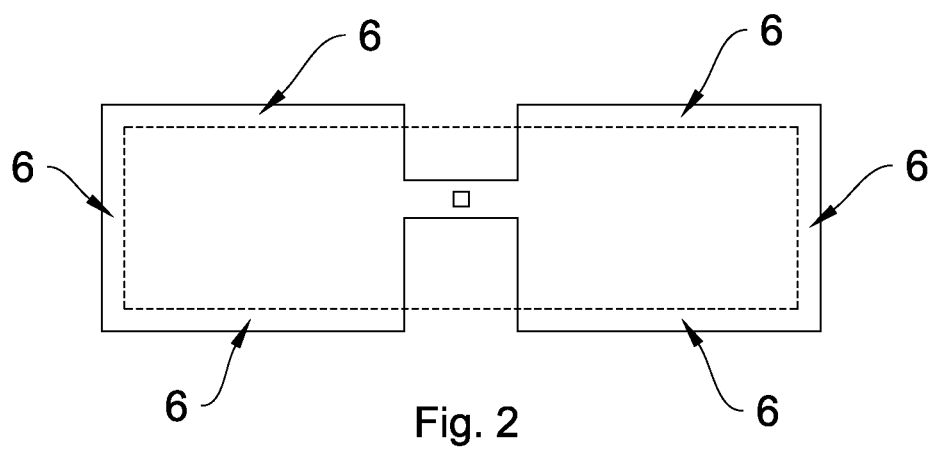
FIG. 2 is a schematic top view of another RFID transponder.

FIG. 2 is a schematic top view of another RFID transponder. According to an aspect, the near field communication section 6 is provided on at least two edges of the radiating element 2 by extending said edges over the edge of the ground plane 4. In the embodiment shown in FIG. 2, all the edges of the radiating elements 2 extends over the ground plane 4—except the edge being towards the IC 3. An advantage is that the RFID transponder 100 can be encoded in various types of encoders having diverse antenna configurations.

It is to be noted that the IC 3 may also be arranged on/in the near field communication section 6.

Figure 3:
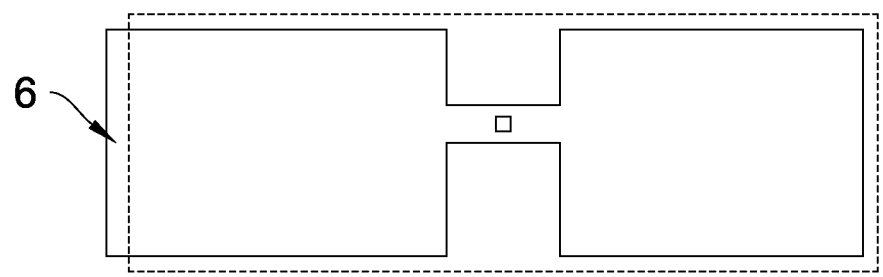
FIG. 3 is a schematic top view of a third RFID transponder.

FIG. 3 is a schematic top view of a third RFID transponder. In this embodiment, only one of plurality of radiating elements 2 comprises the near field communication section 6. This embodiment is quite similar to that shown in FIG. 1, except the near field communication section 6 being arranged at the end edge of the radiating element 2. An advantage is that the production of the RFID transponder may be implemented in simple and effective way.

Figure 4:
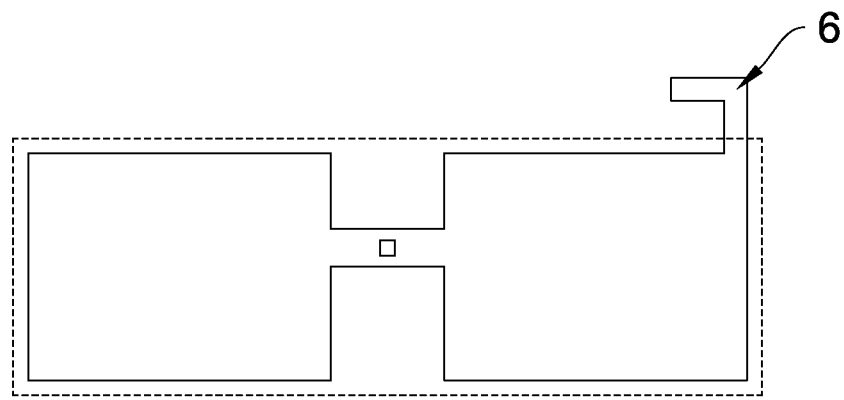
FIG. 4 is a schematic top view of a fourth RFID transponder.

FIG. 4 is a schematic top view of a fourth RFID transponder. According to an aspect, the near field communication section 6 is provided by a projection extending from the radiating element 2 and having an elongated aspect ratio. In the embodiment shown in FIG. 4, the projection comprises one bend. The projection may also be straight, meandering, curved etc. An advantage is that the near field communication section 6 may be designed so that its influence on the main antenna or the radiating element(s) is negligible.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 printable coating
2 an antenna element
3 IC
4 ground plane
5 inlay
6 near field communication section
7 spacer layer
100 RFID transponder
BOT bottom side
TOP top side

The invention claimed is:

1. An RFID transponder for printing and encoding, comprising
   a printable surface on a top side of the transponder,
   an antenna element under the printable surface, the antenna element comprising an antenna and an IC coupled to the antenna, the antenna comprising at least two radiating elements,
   a ground plane arranged under the radiating elements, the ground plane being solid without openings,
   only one of the radiating elements comprising a near field communication section extending over an edge of the ground plane for enabling near field communication of the antenna by the ground plane from a backside of the RFID transponder.

2. The RFID transponder as claimed in claim 1, wherein a spacer layer made of a dielectric material is arranged between the antenna element and the ground plane.

3. The RFID transponder as claimed in claim 1, wherein the antenna comprises two radiating elements arranged at a distance from each other, and the IC being situated between said two radiating elements.

4. The RFID transponder as claimed in claim 1, wherein the at least two radiating elements are quadrangles.

5. The RFID transponder as claimed in claim 4, wherein the near field communication section is provided by prolongation of two parallel sides of one of the quadrangle, the near field communication section thus being situated at one edge of the radiating element.

* * * * *